BEST AVAILABLE COPY

3 Sheets. Sheet 1

C. Chambers Jr.

Paper Folder.

No. 4266. Reissued. Feb. 21. 1871.

Witnesses;
A. C. Bradley
H. W. Howard

Inventor;
Cyrus Chambers Jr
By his Attorney
Chas. F. Ransburg

3 Sheets, Sheet 2.

C. Chambers, Jr.

Paper Folder.

No. 4266. Reissued. Feb. 21. 1871.

Witnesses;
A. C. Bradley
F. W. Howard

Inventor.
Cyrus Chambers Jr.
By his Attorney
Chas. F. Sansbury

3 Sheets. Sheet 3

C. Chambers. Jr.

Paper Folder.

No. 4266. Reissued. Feb. 21. 1871.

Witnesses;
D. C. Bradley
H. W. Howard

Inventor;
Cyrus Chambers Jr
By his attorney
Chas. F. Stansbury

United States Patent Office.

CYRUS CHAMBERS, JR., OF PHILADELPHIA, PENNSYLVANIA.

Letters Patent No. 15,842, dated October 7, 1856; reissue No. 4,079, dated July 26, 1870; reissue No. 4,266, dated February 21, 1871.

IMPROVEMENT IN PAPER-FOLDING MACHINES.

BEST AVAILABLE COPY

The Schedule referred to in these Letters Patent and making part of the same.

*To all whom it may concern:*

Be it known that I, CYRUS CHAMBERS, Jr., formerly of Kennet Square, Pennsylvania, now of Philadelphia, Pennsylvania, have invented a "Machine for Folding Paper;" and I do hereby declare the following to be a full and correct description of the same, reference being had to the accompanying drawing, in which—

This invention is an improvement in machinery for folding paper for books, and relates—

First, to the adaptation of register-pins to present the printed sheets of paper directly to the folding mechanism by being introduced into holes previously made in the paper when printed, said holes being made in the line of the first fold.

Second, to the manner of adjusting said register-pins so as to enter the holes in the paper, and also adjusting them so as to present the printed sheets of paper in proper position to receive the first fold by the action of the folding-blades and rollers.

Third, to the manner of presenting the once-folded sheet of paper to the second-folding mechanism in proper position to receive the second fold.

Fourth, to the manner of arresting and retaining folded sheet preparatory to receiving additional Fifth, to the manner of carrying, presenting, and retaining the paper in position for folding.

Sixth, to the peculiar movement of the folding-blades between the rollers.

Seventh, to the mode of arresting at will the motion of certain parts of the folding mechanism to allow time for registering the theet.

In order to enable others to make and use my invention, I proceed to describe its construction and operation.

Figure 1:
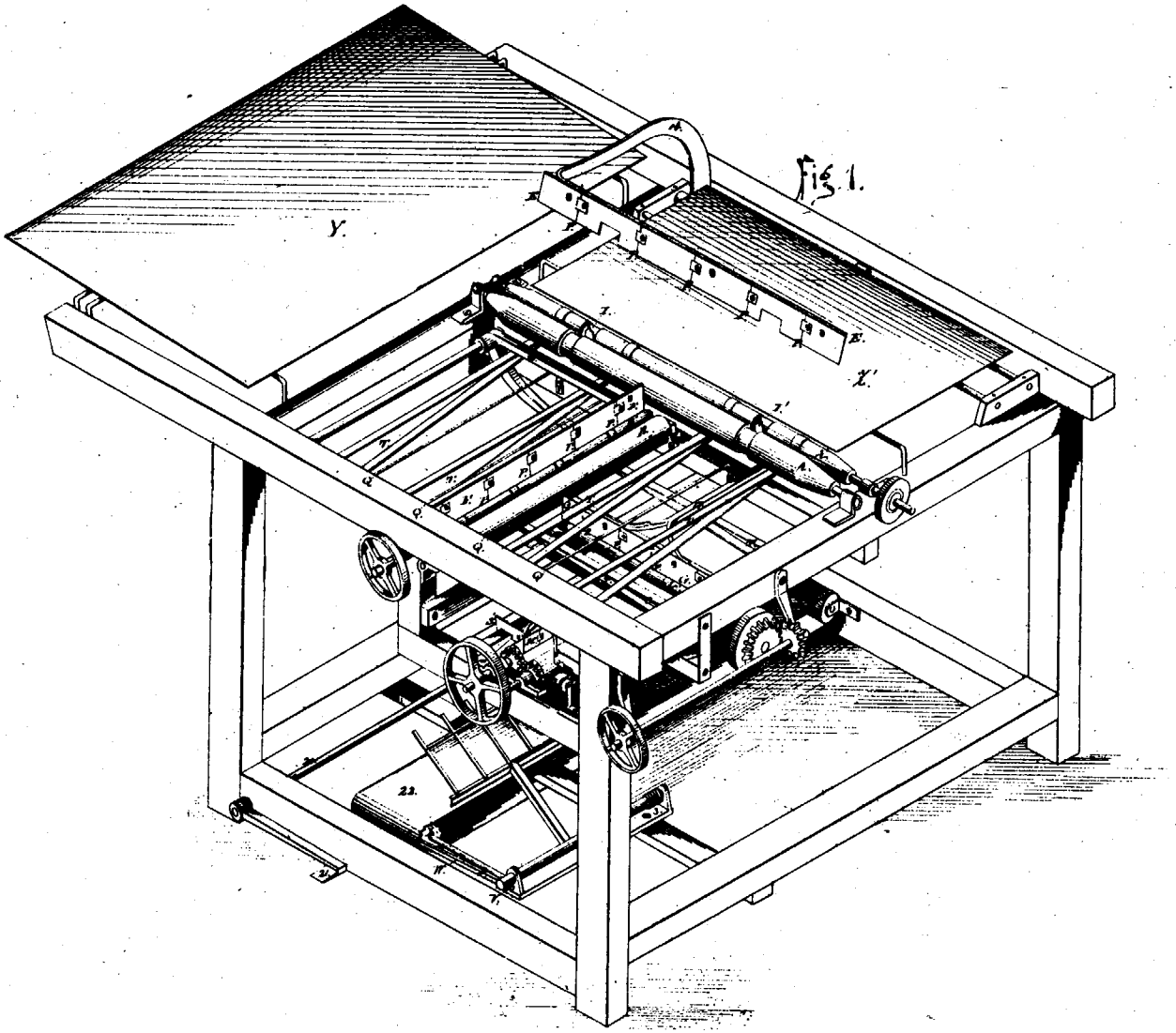
Figure 1 represents the machine in perspective, with half of the cover or feeding-table Z removed.

In the drawing is represented a frame of any suitable material in which the whole of the machinery is supported, as clearly represented in fig. 1.

To the upper projecting arms of the frame and to the left-hand side of the machinery is attached the table Y, slightly inclined toward the machine, for holding the "bank" of unfolded sheets.

Across, near the center, and at the top of the frame are located the first two folding-rollers A A' running in suitable bearings secured to the side pieces of the frame.

At right angles to and below the rollers A A' are located the rollers B B', having their bearing at one end under the rollers A A' and secured to the central cross-bar, and at the other end secured to the under side of the rear upper end rail of the framing, as clearly shown in fig. 1.

The distance between the top surface of the rollers B B' and the lower surface of the rollers A A' should be such as to allow the free passage of a folded sheet of paper when carried out horizontally from the rollers A A', so that it will not come in contact with the surface of the rollers B B'.

In like manner are arranged the rollers C C' below the rollers B B', and D D' below the rollers C C', each pair having appropriate bearings in the cross-pieces of the framing, as shown in fig. 1.

Between the rollers A A', and within grooves in them, the register-pins I I' project upward, their shoulders coming level with the table Z Z'. They are secured to the bar K by means of a V-O, and adjusting and binding-screws *s s'*. Their points project slightly above the table Z Z', and are dressed slightly conical, round, and smooth, for readily entering the holes in the paper, (see figs. 2 and 3.)

The bar K slides in a V on the transverse arm of lever L, and is adjusted and retained in its position by the adjusting screw 2, (see figs. 2, 3, 10, and 11.)

The register-pin I' has intervening between it and the bar K the block M, in which the register-pin I' slides in a V, and the said block M slides in a V on the bar K, and is adjusted and retained by the screw 1.

The screws 1 and 2 turn loosely in a plate fixed to

BEST AVAILABLE COPY
BEST AVAILABLE COPY the end of the bar K between shoulders, and are respectively tapped into the block M and the lever L.

Set-screws s s' fix the register-pins I I' respectively in the Vs in which they slide in any desired position. Thus the longitudinal and transverse adjustment of the register-pins is provided for, and the longitudinal adjustment may be made upon both at once or upon one separately, as may be required.

The lever L is secured to its shaft, which has suitable bearings in boxes secured to the main frame, (see figs. 1 and 2,) and derives its motion from a cam, 5, through the friction-roller and adjustable bracket 15.

Extending from a rock-shaft near to the shaft of the lever L and parallel thereto, and about level with the center of the rollers A A', (see figs. 1 and 2,) is the bent arm 14, which carries the first-folding blade E. This arm is of such length as to allow the edge of the folding-blade to come between the rollers A A'.

Figure 2:
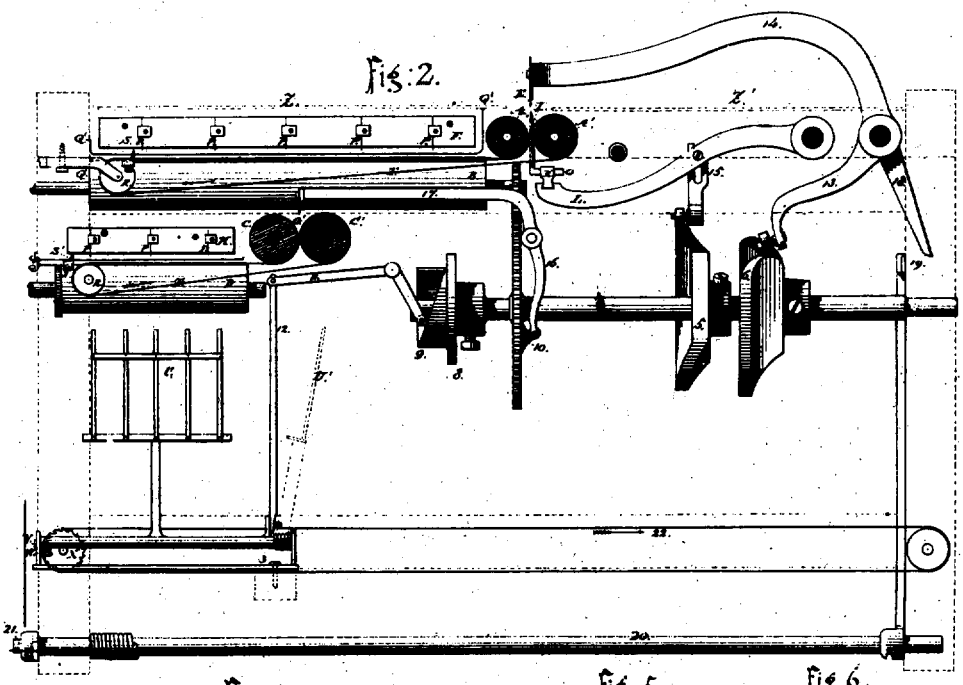
Figure 2 is a sectional view, showing the general arrangement of the machine.
Figure 3:
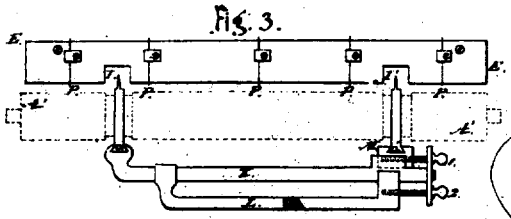
Figure 3 represents the register-pins or points, the manner of adjusting them and retaining said adjustments; also, their manner of holding the sheet until it is seized by the fine points or the the blade E.
Figure 5:
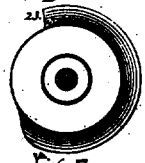
Figure 5 shows the shape of the cam for operating lever L, carrying register-pins I I'.

It derives motion from the cam 6 through the friction-roller and arm 13, as clearly shown in fig. 2.

The bent arm 14 has a projection, 18, on it, which extends downward and within the range of the top of the lever 19, said lever extending up from the shaft 20, which works in suitable bearings in the lower end rails of the framing.

The shaft 20 has attached to the projecting end, at the rear end of the machine, a treadle, 21, which treadle is held up, and the lever 19 back, to clear the path of the projection 18 by means of a spring coiled around the shaft.

The blade E has two notches cut out opposite to the register-pins I I' of suitable width to allow of the adjustment of the pins and of suitable depth to allow the edge of the blade to come on a line with the shoulders of the register-pins.

This blade has also a number of needle-points, P P, secured to it by means of small grooves cut in the blade, and of "clips" and screws. These points are allowed to project below the edge of the blade, so as to penetrate the paper before the edge of the blade comes in contact therewith, for reasons which will be hereafter explained.

To the radiating arms 26, (see figs. 1, 2, and 9,) from a shaft on the left-hand side of the machine, working in suitable bearings, is attached the second folding-blade F, in such manner that its edge shall come between the rollers B B'.

To the edge of this blade are attached the fine points P P, as described for the blade E; and in like manner the blades G and H are attached to their arms and shafts 17 and 27, so as to come between the rollers C C' and D D', and are provided with points P P, as before described.

Around the roller A' down between the rollers A and A', horizontally to the adjustable tape-pulley R, and back to the roller A', passes a series of endless tapes, T, (see figs. 1 and 2,) in such manner as to convey a folded sheet of paper issuing from the rollers A and A' horizontally above the rollers B B', and under the knife F, when it is up.

Between the tapes T T, and slightly below their upper surface, and parallel therewith, are located the bars Q Q Q Q. (See figs. 1, 2, and 4.)

Figure 4:
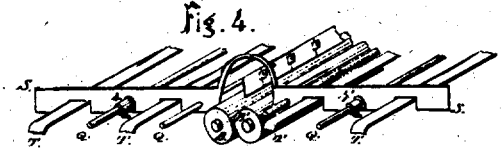
Figure 4 represents the mechanism which carries out, presents, and retains the paper ready for the operation of the next folding mechanism.

Sliding on these bars Q, and at right angles thereto, is the stop-bar S, which projects above the surface of the said bars, and across the path of the sheet of paper moving on the tapes T and the bars Q, and has notches cut out to clear the tapes, and holes for the bars Q to pass through, and an arch-spring over the folding-blade F, as clearly shown in fig. 4.

The said stop-bar may be fixed in any desired position on the bars Q by means of the set-screws 4 and 4'.

To the under side of the table Z are secured bars Q', (see fig. 2,) whose under sides are slightly above the top surface of the tapes T, and below the edge of the folding-blades F, which allows the paper to pass along between them and the tapes T, and over the bars Q, preventing it from leaving the tapes T, and striking against the blade F, and insuring the folded edge of the paper striking against the stop-bar S.

From the rollers B B' and C C' passes a like series of tapes, T, for conveying the paper out horizontally; and above said series of tapes are arranged the bars Q', secured to the main framing, arranged, as before described, for the first series of tapes, to prevent the paper from leaving the tapes, or striking against the blades G and H, (see fig. 2,) and to insure its striking against the respective stop-bars S'—one not shown.

Figure 9:
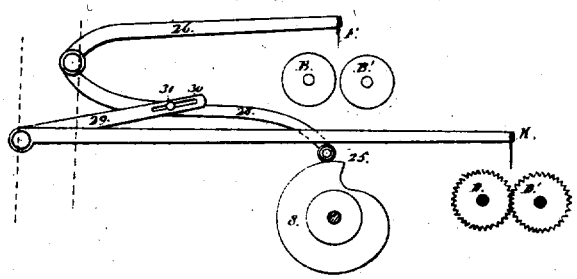
Figure 9 shows the manner of operating the blades F and H by means of the cam 8, giving the same amount of throw to each.
Figure 10:
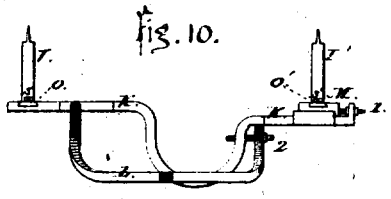
Figure 10 is an elevation of the lever L, bar K, and register-pins I I', showing the several adjustments of the bar and pins.
Figure 11:
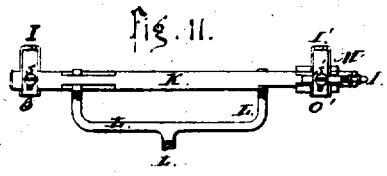
Figure 11 is a top view of the parts represented in fig. 10.

The blades F and H are operated by the cam 8, as clearly shown in fig. 9, and the blade G is operated by the cam 10 on the spur-wheel of the main shaft, as clearly shown in fig. 2, the said blade G being held up by a spring (not shown) coiled about its axis. The peculiar movement of these blades will be more particularly set forth hereafter.

Under the rollers D D', secured to a suitable shaft working in boxes, secured to a swinging frame, is the fly U, which derives its upward motion from the cam 9 on the main shaft, bell-crank 11, and connecting-rod 12.

The downward motion of the fly U is given by a spring coiled around its shaft, as clearly shown in figs. 1 and 2.

The swinging frame, carrying the shaft of the fly U, is secured to a cross-rail of the main framing by the screw 3, in such a position that it may swing around, as represented by dotted lines in fig. 2, to receive the folded sheets when issuing from the rollers C C', when so desired, the fly U being represented in proper position to receive the folded sheets from the rollers D D' in fig. 2.

At right angles to the shaft of the fly U, working in suitable bearings, is a roller, X, with a ratchet-wheel on the end nearest to the fly, said ratchet-wheel being operated by the lever W and tappet V on the shaft of the fly U.

Around the roller X, and horizontally along under the machine, and to the other side, and around another roller working in suitable brackets secured to the lower cross-rail of the machine, passes the endless belt 22, in position to receive the folded sheets from the fly U. (See figs. 1 and 2.)

When it is desired to deliver the folded sheets from the rollers C C', the endless belt 22, with its accompanying rollers, as well as the fly U, is turned at right angles to the position shown in fig. 1, and the belts T T thrown off the tape-pulley R' and the rollers C C'. The sheet will then be delivered at the third fold.

The main cam-shaft is hung in suitable brackets, and derives its motion from the end of the roller B, through the pinion and spur-wheel, as clearly shown in fig. 2.

The rollers B B' and D D' receive their motion from a belt running from a pulley on a counter-shaft, running in suitable brackets on the right-hand side of the main framing, the rollers C C' deriving motion therefrom by means of bevel-gear.

The rollers A A' receive motion from a belt passing over a pulley on the shaft of the roller C, as clearly shown in fig. 1.

The speed of the rollers A A' and B B' should be such as to carry the largest sheet the machine is designed to fold from the first folding-blade E, through the second folding-rollers, and to the second stop-bar, (not shown in the drawing,) and to a position proper to receive the third fold during one revolution of the main shaft; and, in like manner, the rollers C C' and D D' should carry out the folded sheets in another revolution of the main shaft, so that any number o sheets fed successively to the machine may clear each other in their passage through.

The roller D′ is geared from the roller D by spur-wheels, as shown in figs. 1, 2, and 9.

The rollers A, B, and C have motion communicated to them by means of tapes passing under them from their appropriate rollers, which are driven positively, as before described.

*Operation.*

The printed sheets of paper having been perforated during the process of printing, with a view to being folded on a folding machine, said perforations approximating to the center line of the first fold, and being at the same distance apart that the register-pins I I′ are from each other, and said paper being laid on the table Y with the signature or first page down, and in such position as to allow it to be "folded out," a single sheet is taken from the pile or "bank," placed in such position on the table Z Z′ and under the blade E that the pin I will enter one of the perforations. Then the pin I′ is brought to such a distance from the pin I by the adjusting-screw 1 (see fig. 3) that it will just enter the second perforation in the sheet.

The position of the sheet now being under the control of the register-pins I I′, the sheet should be brought into such a position that the blade E will strike it in the line where the first fold is to be made by adjusting the register-pins by means of their Vs O O′ and set-screws *s s*′.

After the position of the first fold has been determined, the sheet should be moved, by means of the register-pins I I′, bar K, and the adjusting-screw 2, until the line for the second fold comes directly over the edge of blade F.

Power now being applied to the counter-shaft, the blade E is caused to descend by gravity, its motion being regulated by the cam 6 until its edge strikes the paper and the fine points P P have perforated it, thus preventing any possibility of the paper shifting on the edge of the blade E.

The register-pins I I′ are withdrawn by gravity, their motion being regulated by the cam 5, and they leave the perforations in the paper at a greater velocity than that at which the blade E descends, but not until the points P have entered the sheet.

The blade E, on its further descent, forces the paper between the rolls A and A′, creasing it at the line at which the points P P penetrate it, the rolls drawing the paper off from the points.

The blade E stops just before it reaches the line of contact of the rolls A A′.

The continuous motion of the rolls draws the paper through once double, the tapes T T turning and sliding it on the bars Q, and under the bars Q′, until its folded edge is arrested by the stop-bar S.

The bars Q and Q′ prevent the paper from doubling up by the friction of the tapes T, or the momentum of the paper. The bars Q′ prevent the paper from rising off the tapes, striking against the blade F, or the points thereon, and insure the folded edge striking against the stop-bar S.

The stop-bar S is adjusted at such distance from the blade G as it is desired to have the third fold distant from the first.

The blade F now descends by gravity, its motion being regulated by the cam 8, until the once folded sheet is forced between the rollers B B′ and carried out by the tapes T T, running therefrom, until its second folded edge strikes against the stop, placed at right angles to the rollers C C′, (not shown in the drawing.)

The blade G next descends, and, in like manner, forces the paper between the rollers C C′, whence it is carried by the tapes T under the blade H, and under the bar Q, until its third-folded edge strikes against the stop-bar S′, (see fig. 2.)

The blade H now descends, forcing the sheet between the rollers D D′, thus folding it a fourth time when it drops onto the fly U and is laid on the belt 22.

The tappet V, on the end of the fly-shaft, operating on the lever W, rotates the ratchet-wheel X, and with it its roller one notch forward, thus moving the endless apron 22 a short distance in the direction of the arrow, (see figs. 1 and 2.)

About the time of the descent of the blade G the blade E is again ready to make the first fold in the next succeeding sheet, which has been registered on the pins I I′ during the times they and the blade E remain up, as shown in fig. 1.

Should the operator fail to get the sheet pointed before the descent of the blade E, its motion may be arrested by pressing on the treadle 21, which throws forward the arm 19 so as to come across the path of motion of the projection 18 of the blade-arm 14, and thereby prevents its descent, thus preventing incorrect folding of the sheet, or injury to the hands of the operator, and allowing ample time to point the sheet.

Should the folding-blade E descend between the rollers A A′ at a less speed than that at which the surface of the rollers moves, they will be liable to draw the sheet from the blade before the crease is definitely made, thereby rendering it liable to fold elsewhere than where the points on the blade struck it, thus making inaccuracies in the first fold.

The sheet also would be liable to be drawn from the blade at one end before the other, and thus be started between the rolls at an angle and brought sidewise under the second-folding knife F, thereby producing irregularities in the position of the second fold. Hence the necessity of the folding-blade E passing between the rollers A A′ at a velocity equal to or greater than that of the periphery.

For the same reasons the blades F, G, and H should move at a greater velocity than the the periphery of the rollers with which they operate.

Also, for the further reason that, if they moved at a lower velocity, the outside pages of the once, or more frequently folded sheets, would be drawn between the rollers in advance of the inside pages, thus causing the folds in the different pages to be some distance from each other, and rendering the subsequent folds inaccurate and unsightly.

These peculiar motions of the blades are obtained by the peculiar shape of the cams and the proportions of the arms of the levers operating them.

Figure 6:
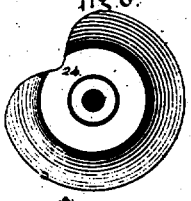
Figure 6 shows the shape of the cam for operating the first folding blade E.
Figure 7:
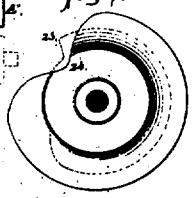
Figure 7 shows the position of the cams 23 and 24 on the main shaft, with respect to each other.
Figure 8:
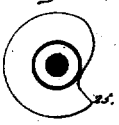
Figure 8 shows the cam 25, which operates the blades F and H.

The cams are constructed, as a general rule, in combination with the friction-rollers running thereon, so as to allow the gradual descent of the blades until near their contact with the paper, and then to permit them to descend rapidly to the lowest point of their motion when they gradually return to their original position, as clearly shown in figs. 6, 7, and 8.

The cam 5, operating the register-pins, is made still steeper than the cam 6, operating the blade E, the effect being to withdraw the pins, as before specified. The construction is clearly shown at 23 and 24 in fig. 7.

As the folded sheets accumulate on the endless belt 22, and the belt is moved slightly at the time each sheet is laid upon it, it is evident that each sheet will be so deposited that its "head" will overlap the previously-deposited sheet, thus preventing the pile from becoming so high as to fall over, and yet enabling the belt 22 to hold a considerable number of folded sheets.

Having thus fully described my invention and the mode of operating it,

What I claim, in machinery for folding paper, is—

1. The register-pins I I′, located between the first pair of folding-rollers and in the line of the first fold in such position as to present the paper to be acted upon by the first-folding device.

2. The register-pins I I′, adjusted and retained in adjustment by means of slides *o o′* and screws *s s′*, bar K, block M, and screws 1 and 2, substantially as set forth.

3. The combination of the register-pins I I′, bars Q Q′, and stops S, and carrying-tapes T T, or their equivalents, for correctly presenting and retaining the paper in position to receive the second and succeeding folds, substantially as described.

4. The combination of bars Q Q′ and stop-bar S, for guiding and retaining the paper in position for receiving the various folds.

5. The folding-blades E, F, G, and H, receiving a motion equal to or greater than the surface motion of their respective folding-rollers, by the shape of the cams 6, 8, and 10 actuating said blades, substantially as shown and described.

6. The mechanism described, or its equivalent, for arresting at will the moving part of the folding device, the same consisting of the treadle 21, shaft 20, and levers 19 and 18.

7. The confining-bars Q Q′ in a paper-folding machine, substantially as and for the purpose set forth.

The above specification of my said invention signed and witnessed at Philadelphia, this 8th day of October, A. D. 1870.

CYRUS CHAMBERS, JR.

Witnesses:
W. PRICE DAVIS,
WILLIAM MENDHAM.